(12) United States Patent
Choi et al.

(10) Patent No.: US 7,801,081 B2
(45) Date of Patent: Sep. 21, 2010

(54) METHOD AND SYSTEM FOR HANDOVER IN MOBILE COMMUNICATION NETWORK

(75) Inventors: Yong-Seouk Choi, Daejeon (KR); Kyung-Soo Kim, Daejeon (KR)

(73) Assignees: Electronics and Telecommunications Research Institute, Daejeon (KR); Samsung Electronics Co., Ltd., Suwon-si (KR)

(*) Notice: Subject to any disclaimer, the term of this patent is extended or adjusted under 35 U.S.C. 154(b) by 658 days.

(21) Appl. No.: 11/847,843

(22) Filed: Aug. 30, 2007

(65) Prior Publication Data
US 2008/0125125 A1 May 29, 2008

(30) Foreign Application Priority Data
Nov. 27, 2006 (KR) .................. 10-2006-0117573

(51) Int. Cl.
*H04Q 7/20* (2006.01)
*H04Q 7/00* (2006.01)
*H04B 7/216* (2006.01)

(52) U.S. Cl. ............... 370/331; 370/335; 370/338; 455/436; 455/442

(58) Field of Classification Search ......... 370/329–338; 455/69, 67.11, 437–444, 450, 452.2, 517; 375/141–149
See application file for complete search history.

(56) References Cited

U.S. PATENT DOCUMENTS

| | | | |
|---|---|---|---|
| 5,924,033 A | | 7/1999 | Carlsson et al. |
| 2004/0058678 A1* | | 3/2004 | deTorbal ................ 455/437 |
| 2006/0229075 A1* | | 10/2006 | Kim et al. ................ 455/436 |
| 2007/0086387 A1* | | 4/2007 | Kang et al. ............... 370/331 |
| 2007/0291698 A1* | | 12/2007 | Lee et al. ................. 370/331 |

FOREIGN PATENT DOCUMENTS

| | | |
|---|---|---|
| KR | 1020060024884 A | 3/2006 |
| KR | 1020060024885 A | 3/2006 |
| KR | 1020060047727 A | 5/2006 |
| KR | 1020060049179 A | 5/2006 |
| KR | 1020060129886 A | 12/2006 |

* cited by examiner

Primary Examiner—Afsar M. Qureshi
(74) Attorney, Agent, or Firm—Jefferson IP Law, LLP

(57) ABSTRACT

A handover method according to an embodiment of the present invention includes: receiving neighboring base station information at a wireless relay station providing a wireless communication service moving together with a plurality of subscriber stations that move along the same moving path; performing scanning to check a wireless environment state of a neighboring base station using the received neighboring base station information; performing handover of the plurality of subscriber stations to a target base station as a single handover unit, when a handover condition is met during the scanning; and notifying the subscriber station of completion of handover preparation with the target base station.

19 Claims, 6 Drawing Sheets

METHOD AND SYSTEM FOR HANDOVER IN MOBILE COMMUNICATION NETWORK

CROSS-REFERENCE TO RELATED APPLICATION

This application claims priority to and the benefit of Korean Patent Application No. 10-2006-0117573 filed in the Korean Intellectual Property Office on Nov. 27, 2006, the entire contents of which are incorporated herein by reference.

BACKGROUND OF THE INVENTION (a) Field of the Invention

The present invention relates to a method and a system for enabling handover in a mobile communication network. More particularly, the present invention relates to a method and system for providing handover of a plurality of subscriber stations that have the same moving path.

(b) Description of the Related Art

A wireless portable Internet system such as a wireless broadband (WiBro) system or a high-speed portable internet (HPi) system is a type of mobile communication system. Such a wireless portable Internet system is a next generation communication scheme that provides mobility in local area data communication using a fixed access point (AP) such as a conventional wireless LAN.

Typically, in a wireless portable Internet system, a handover is a function that provides mobility of a subscriber station. Location and situation where the handover occurs differ for respective subscriber stations, and quality of service (QoS) also differs depending on a service mobile communication network that is used. Accordingly, an entire handover is processed between each subscriber station and a serving base station in a one-to-one correspondence.

Therefore, the wireless portable Internet system remains in an active state of services longer than a voice-dominated service system, and it performs handover more frequently than the same. For example, when a plurality of users are using the wireless portable Internet service in a transportation means such as a bus or a train, scanning as a pre-process of the handover and signaling as an actual operation of the handover are required to occur at respective terminals of the users at the same time.

FIG. 1 is a flowchart showing a conventional handover process of a plurality of subscriber stations.

Referring to FIG. 1, a plurality of subscriber stations collect cell information of a neighboring base station by receiving a neighbor advertisement (NBR-ADV) message from a serving base station (S110).

Subsequently, for a handover operation, each of the plurality of subscriber stations periodically performs a scanning process for checking a wireless state of a cell of the neighboring base station (S120).

When the subscriber stations move in the same direction and a handover condition for them is thereby satisfied, each of the subscriber stations requests handover by sending an MS-HO-REQ message to the serving base station. Then, the serving base station that has received the handover request separately sends a BS-HO-RSP message to each of the subscriber stations as a response to the handover request (S130).

Having received the BS-HO-RSP message from a serving base station, each of the subscriber stations separately sends an MS-HO-IND message to the serving base station to notify of handover completion (S140), and then performs a process for ending a connection with the serving base station (S150).

Subsequently, the subscriber stations start a ranging process with a target base station of a cell to which the subscribe stations has moved, and thereby sets up a connection thereto so as to receive a wireless portable Internet service (S160).

As describe above, when a plurality of subscriber stations escape from a cell of a serving base station and move to another cell of a target base station, each of the subscriber stations separately requests handover to the serving base station and performs a ranging process with the target base station of the cell to which the subscriber stations are moving.

When a plurality of subscriber stations simultaneously perform handover while moving together in a transportation means such as a train or a bus, transmission of messages for handover operation between the subscriber station and the serving base station abruptly increases so as to possibly cause insufficiency of a wireless band.

During a random access of the subscriber stations to the base station in order to request a resource allocation, probability of collisions with subscriber stations that are already handled by the target base station increases. In this case, latency increases.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and a system for enabling handover in a mobile communication network having advantages of enhanced efficiency in bandwidth management and reduced latency during a handover process.

An exemplary handover method according to an embodiment of the present invention includes: receiving neighboring base station information at a wireless relay station providing a wireless communication service moving together with a plurality of subscriber stations that move along a same moving path; performing scanning to check a wireless environment state of a neighboring base station using the received neighboring base station information; performing handover of the plurality of subscriber stations to a target base station as a single handover unit, when a handover condition is met during the scanning; and notifying the subscriber station of completion of handover preparation with the target base station.

An exemplary system for enabling handover in a mobile communication network according to an embodiment of the present invention includes: a wireless relay station that determines whether a handover condition for a plurality of subscriber stations moving along the same moving path is met, and requests handover of the plurality of subscriber stations as a single handover unit when the handover condition is met; a serving base station that provides neighboring base station information to the wireless relay station and receives a handover request from the wireless relay station; and a target base station that performs the requested handover with the wireless relay station when a handover request of the wireless relay station is received through the serving base station.

An exemplary handover method of a wireless relay station in a mobile communication network according to an embodiment of the present invention includes: receiving neighboring base station information; performing periodic scanning that checks a wireless environment state of a target base station using the neighboring base station information; determining whether a handover condition is met during the checking of the wireless environment; requesting handover of a plurality of subscriber stations to the target base station as a single handover unit when the handover condition is met, the plurality of subscriber stations moving along the same path; receiving a handover preparation completion message from the target base station; and sending, to the subscriber station, a message for notifying completion of handover preparation to the target base station.

An exemplary wireless relay station performing handover in a mobile communication network according to an embodiment of the present invention includes: a transmitting/receiving unit that transmits and receives wireless signals with a serving base station and a target base station, the serving base station being currently associated with the wireless relay system; a base station information storage unit that stores neighboring base station information received from the serving base station through the transmitting/receiving unit; a wireless environment checking unit that checks the wireless environment state of the neighboring base station that corresponds to the neighboring base station information of the base station information storage unit; and a control unit that determines whether a handover condition for a plurality of subscriber stations moving along the same moving path is met based on the wireless environment state of the neighboring base station, and requests handover to the target base station when the handover condition is met.

An exemplary handover method of a subscriber station according to an embodiment of the present invention includes: receiving a message notifying of completion of handover preparation to a target base station, the message being received from a wireless relay station for a plurality of subscriber stations moving along the same moving path; determining whether a dedicated handover region is allocated by the target base station; and performing ranging through the dedicated handover region when the dedicated handover is allocated.

DETAILED DESCRIPTION OF THE EMBODIMENTS

Figure 1:
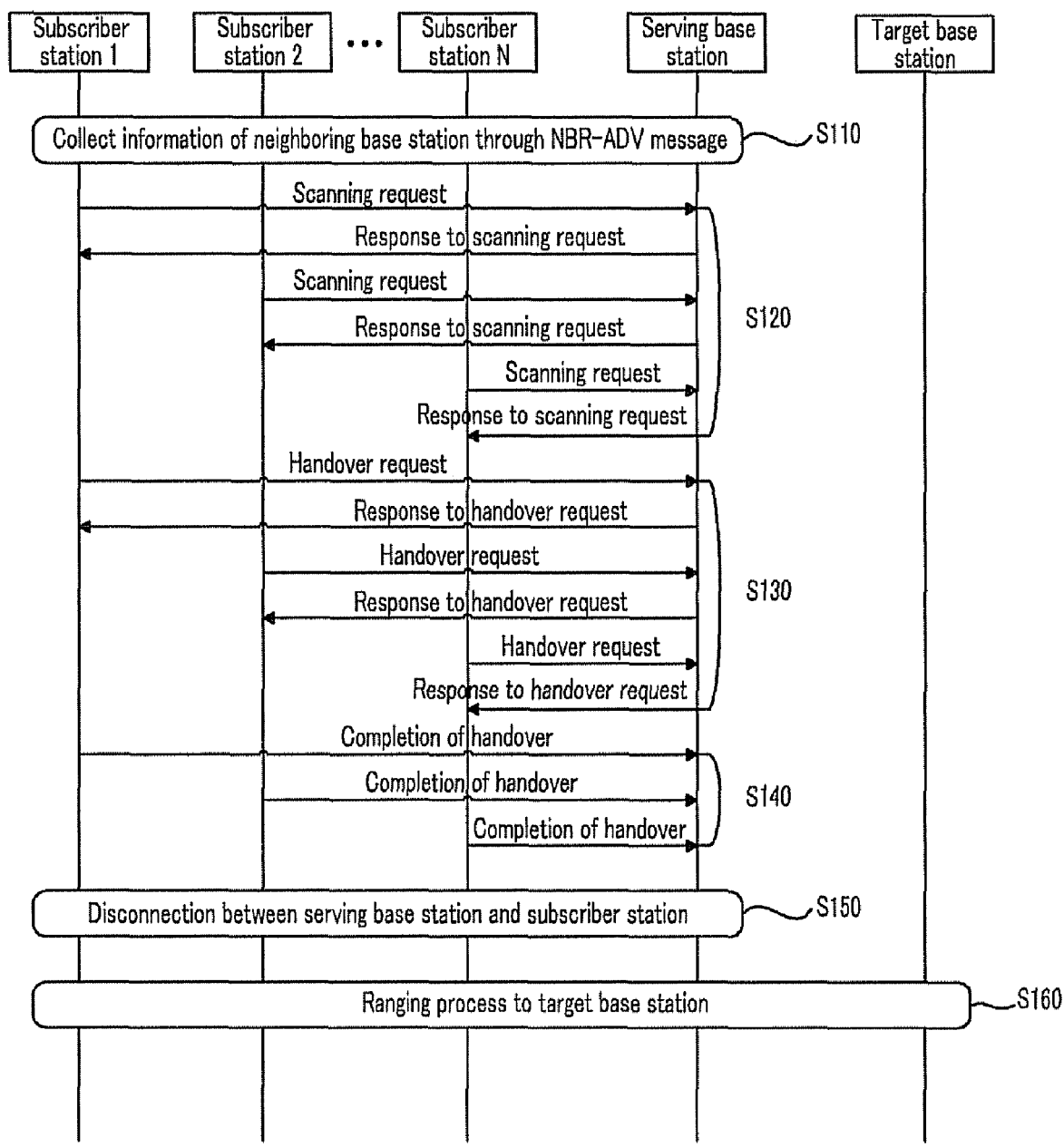
FIG. 1 is a flowchart showing a conventional handover process of a plurality of subscriber stations.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, unless explicitly described to the contrary, the word "comprise", and variations such as "comprises" or "comprising" will be understood to imply the inclusion of stated elements but not the exclusion of any other elements.

Figure 2:
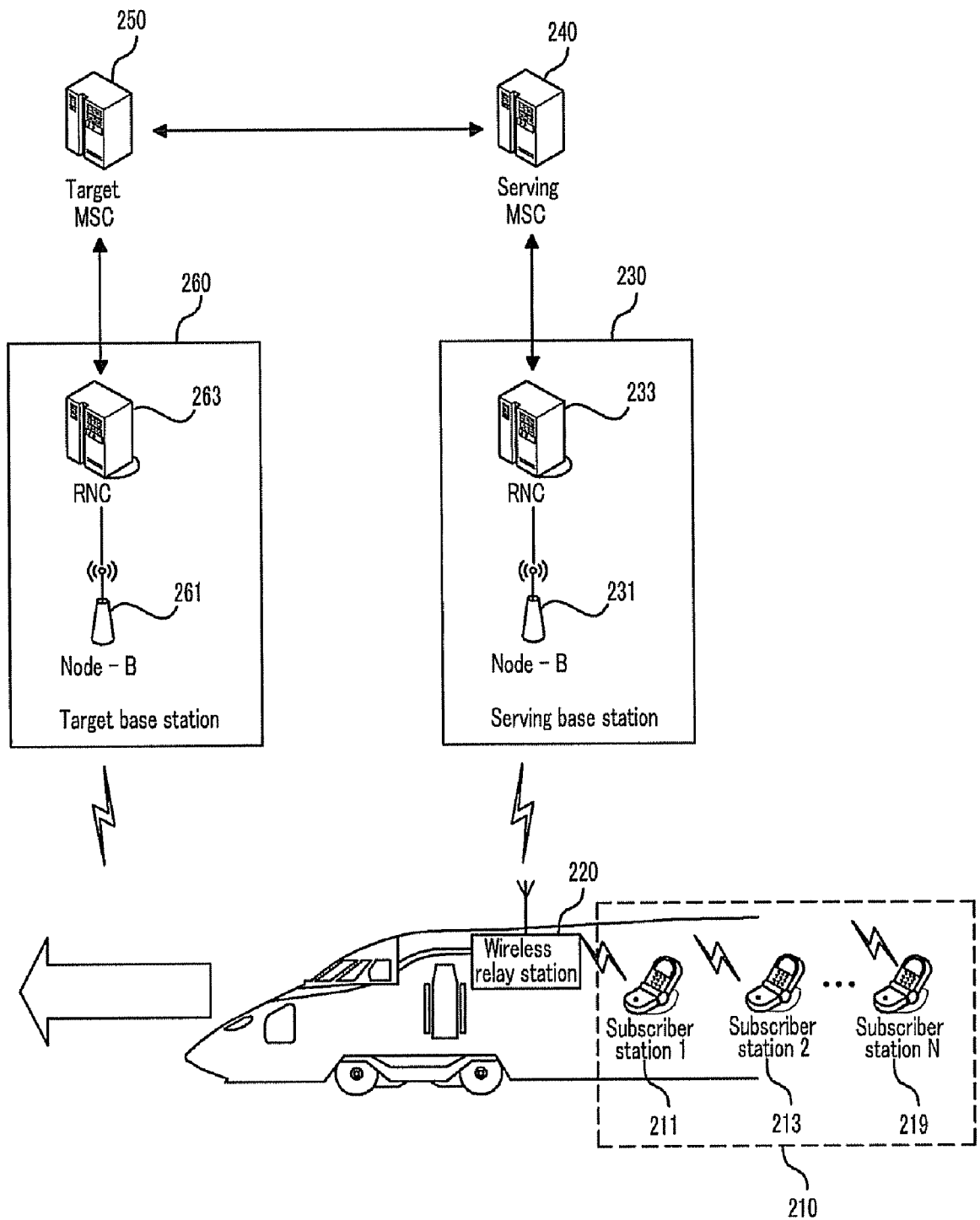
FIG. 2 is a schematic diagram of a handover system using a wireless relay station according to an exemplary embodiment of the present invention.

FIG. 2 is a schematic diagram of a handover system using a wireless relay station according to an exemplary embodiment of the present invention.

For convenience of description, an exemplary embodiment of the present invention is hereinafter described in connection with handover from a serving base station to a target base station according to a movement of a transportation means such as a bus, a train, and an airplane, using a wireless relay station (RS) that is installed in the transportation means and handles a plurality of subscriber stations.

Referring to FIG. 2, a handover system using a wireless relay station according to an exemplary embodiment of the present invention includes a wireless relay station 220, a serving base station 230, a serving MSC (mobile switching center) 240, a target MSC 250, and target base station 260.

Various subscriber stations 211, 212, . . . , and 219 are involved in the exemplary embodiment of the present invention, and they are collectively referred to as subscriber stations 210. Subscriber stations 210 are wirelessly connected with the wireless relay station 220, and they provide a voice call function with other mobile communication terminals through a wireless communication scheme.

Here, the subscriber stations 210 according to an exemplary embodiment of the present invention is wirelessly connected with the serving base station 230 through the wireless relay station 220, and may use a wireless portable Internet service.

The wireless relay station 220 manages subscriber stations 210 that are located within a range that it covers.

The wireless relay station 220 relays a downlink/uplink map that is system information (SI) received from the serving base station 230, and transfers uplink and downlink traffic data to the subscriber stations 210 or the serving base station 230 in an appropriately modulated state.

The wireless relay station 220 collects information of a neighboring base station by receiving a neighbor advertisement (NBR-ADV) message from the serving base station 230. The wireless relay station 220 performs a scanning process for checking a wireless environment state of the neighboring base station based on the collected information of the neighboring base station. During the scanning process, the various subscriber stations 210 covered by the wireless relay station 220 are treated as a single group by the wireless relay station 220. That is, when a handover condition from the serving base station 230 to the target base station 260 is satisfied, the wireless relay station 220 sends subscriber station information of the subscriber stations 210 and service class information to the target base station 260 through the serving base station 230, and then receives a handover response therefrom.

When the subscriber stations 210 are grouped by the wireless relay station 220 depending on service mobile communication networks, uniform quality of service (QoS) is acquired during the handover of the subscriber stations 210.

In order to reduce collision between subscriber stations 210 during a random access to the target base station 260 for handover of the subscriber stations 210, it is preferable that the target base station 260 allocates a dedicated ranging region for the wireless relay station 220.

Here, it is preferable that the subscriber station information is unique basic connection identifiers (BCID) of the subscriber stations 210.

The information of a dedicated handover ranging region received from the target base station 260 is sent to the subscriber stations 210 by the wireless relay station 220. While doing so, the wireless relay station 220 performs a process for ending the connection with the serving base station 230.

Constitution and operation of the wireless relay station 220 will be described later in further detail with reference to FIGS. 4 and 5.

The serving base station 230 is a wireless base station of a wireless portable Internet network. The serving base station 230 includes a Node-B 231 that enables wireless communication with the wireless relay station 220 according to a predetermined protocol and a radio network control unit (RNC) 233 that controls the Node-B 231 and enables call processing.

The serving base station 230 according to an exemplary embodiment of the present invention responds to a scanning request of the wireless relay station 220. In response to the handover request from the wireless relay station 220, the serving base station 230 sends the subscriber station information and service class information received from the wireless relay station 220 to the target base station 260 using a backbone message. Also, the serving base station 230 sends a handover acknowledgement (Ack) response of the target base station 260 to the wireless relay station 220.

The serving MSC 240 and the target MSC 250 are switching centers of the wireless portable Internet network. The serving MSC 240 performs various functions such as basic service processing of wireless portable Internet service, call processing of incoming calls for and originating calls from the subscriber stations, processing of location registration and hand-off, and interworking function with other networks.

The serving MSC 240 according to an exemplary embodiment of the present invention sends the handover request of the wireless relay station 220 received through the serving base station 230 to the target MSC 250. Also, the serving MSC 240 sends the handover acknowledgement response received from the target base station 260 to the serving base station 230.

The target MSC 250 according to an exemplary embodiment of the present invention sends the handover request of the wireless relay station 220 received through the serving MSC 240 to the target base station 260. Also, the target MSC 250 sends the handover acknowledgement response received from the target base station 260 to the serving MSC 240.

The target base station 260 is a wireless base station of a wireless portable Internet network. The target base station 260 includes a Node-B 261 that enables wireless communication with the wireless relay station 220 according to a predetermined protocol, and a radio network control unit (RNC) 263 that controls the Node-B 261 and enables call processing.

When receiving a backbone message including the handover request from the serving base station 230, the target base station 260 according to an exemplary embodiment of the present invention checks its own radio resources and allocates a dedicated ranging region such that the ranging may be enabled for the subscriber stations 210 covered by the wireless relay station 220 after the handover.

A multiple number of subscriber stations 210 are involved in handover of the wireless relay station 220, although they are grouped. Therefore, during the ranging operation of the subscriber stations 210 to the target base station 260 after the handover, the multiple subscriber stations 210 simultaneously perform random access. While doing so, probability of collision with other subscriber stations that are already being serviced by the target base station 260 is expected to increase.

Therefore, in order to reduce the collision probability between the subscriber stations 210 and other subscriber stations that are already being serviced by the target base station 260, it is preferable that a dedicated ranging region is allocated for the multiple subscriber stations 210 when the radio resources are sufficient.

In addition, the target base station 260 sends handover preparation completion information to the serving base station, by sending information of the dedicated ranging region to be allocated for the subscriber stations 210 through the backbone message.

Figure 3:
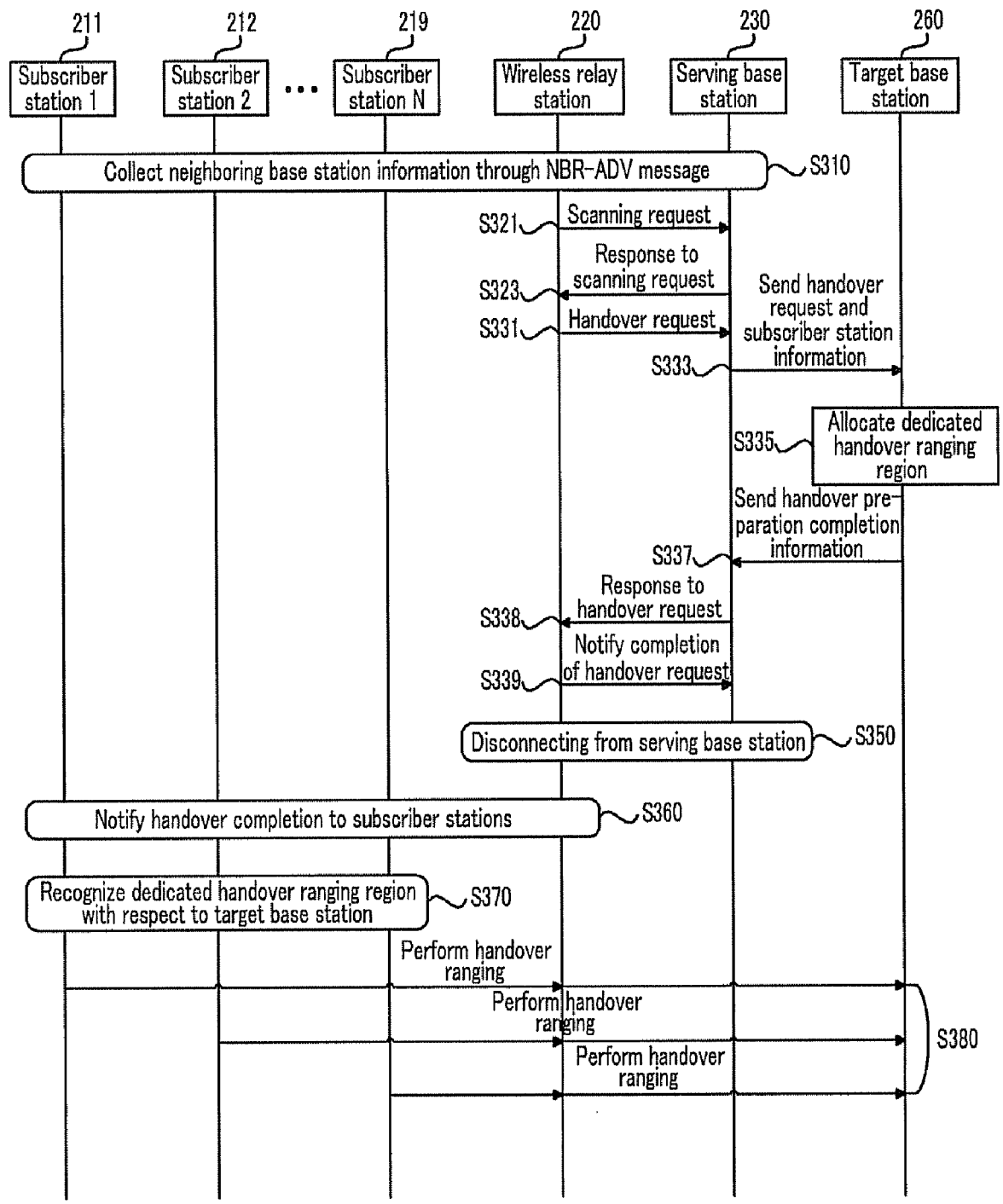
FIG. 3 is a flowchart showing a handover process according to an exemplary embodiment of the present invention.

FIG. 3 is a flowchart showing a handover process according to an exemplary embodiment of the present invention, and the handover process according to an exemplary embodiment of the present invention is hereafter described with reference to FIG. 3.

Firstly, the subscriber stations 210 and the wireless relay station 220 collect neighboring base station information received from the serving base station 230 through NBR-ADV message (S310).

Then, wireless relay station 220 requests scanning to the serving base station 230 in order to obtain the wireless environment state information of the neighboring base station (S321), and then receives a response to the scanning request from the serving base station 230 (S323). The wireless relay station 220 performs the requested scanning operation for a period designated by the serving base station 230 in order to obtain wireless environment state information of the neighboring base station, and it is preferable that a handover beginning time point is determined by a periodic scanning procedure.

When a handover condition is satisfied according to a movement of the transportation means, the wireless relay station 220 sends a handover request message to the serving base station 230 (S331). The handover request message includes subscriber station information and service class information of the subscriber stations 210 covered by the wireless relay station 220. Then, the serving base station 230 transmits the handover request of the wireless relay station 220 to the target base station using a backbone message (S333).

Accordingly, the target base station 260 recognizes subscriber station information and service class information of the subscriber stations 210, and then allocates a dedicated handover ranging region in order for the subscriber stations 210 to perform handover ranging (S335). Then, the target base station 260 sends handover preparation completion information having allocation information of the dedicated handover ranging region to the serving base station 230 (S337). It is preferable that the target base station 260 sends the handover preparation completion information through the backbone message. According to an exemplary embodiment of the present invention, it is preferable that the backbone message includes information that the handover preparation is completed.

Subsequently, the serving base station 230 sends the handover preparation completion information received from the target base station 260 to the wireless relay station 220 (S338), and receives handover completion notification from the wireless relay station 220 (S339).

Upon receiving the handover completion notification from the wireless relay station 220, the serving base station 430 performs a connection finishing operation by initializing all information related to connection with the wireless relay station 220 (S350). At this time, it is preferable that the serving base station 430 performs the connection finishing operation after waiting a handover retain (HO-retain) period, in order to prevent a ping-pong phenomenon of the wireless relay station 220.

After that, the wireless relay station 220 notifies the handover completion to the subscriber stations 210 (S360). In response thereto, each of the subscriber stations 210 recognizes the dedicated handover ranging region allocated by the target base station 260 (S370), and performs a process of access to the target base station 260 (S380). At the step S360, it is preferable that the wireless relay station 220 transmits an RS-MS-HO-IND message to the subscriber stations 210 by broadcasting.

When the dedicated handover ranging region is not allocated by the target base station 260, it is preferable that the subscriber stations 210 perform the process of access to the target base station 260 by a conventional initial ranging process.

Figure 4:
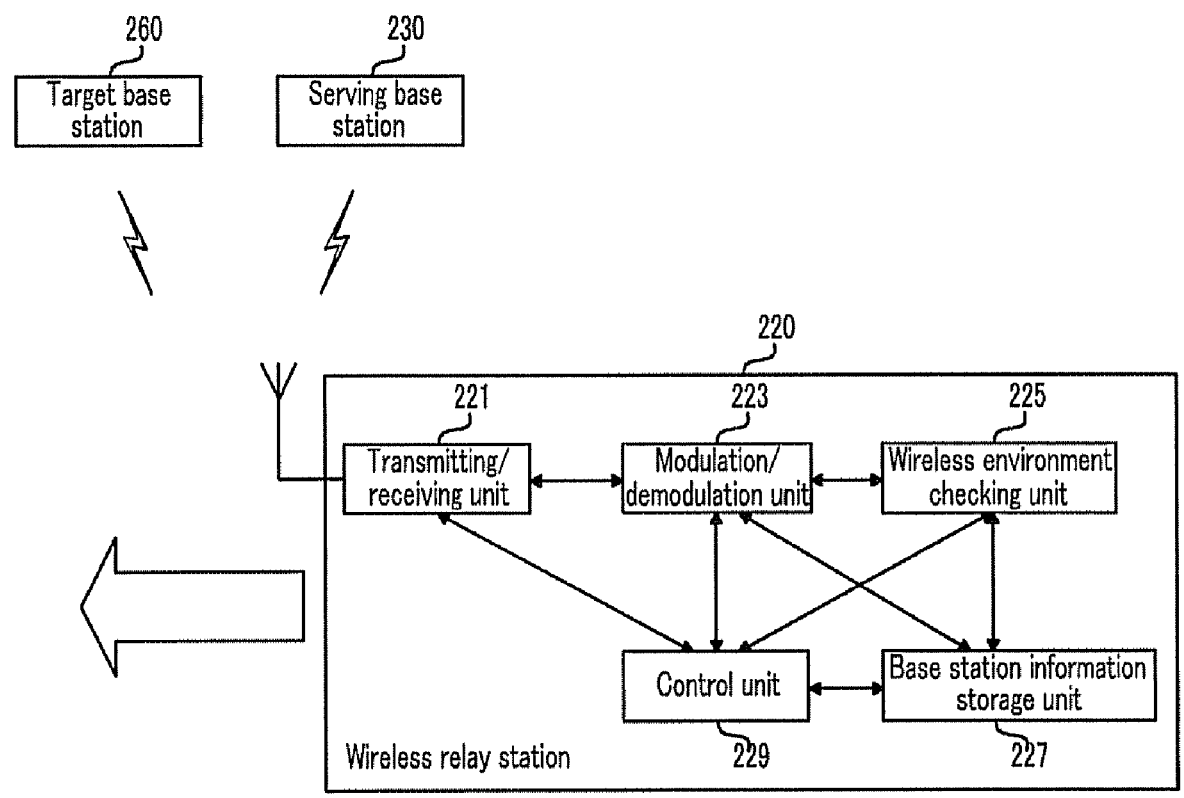
FIG. 4 is a drawing that schematically shows a wireless relay station according to an exemplary embodiment of the present invention.

FIG. 4 is a drawing that schematically shows a wireless relay station according to an exemplary embodiment of the present invention.

Referring to FIG. 4, the wireless relay station 220 according to an exemplary embodiment of the present invention includes a transmitting/receiving unit 221, a modulation/demodulation unit 223, a wireless environment checking unit 225, a base station information storage unit 227, and a control unit 229.

The transmitting/receiving unit 221 transmits and receives a wireless signal through an antenna to and from base stations, which are the serving base station 230, the target base station 260, and a neighboring base station in the exemplary embodiment of the present invention. Here, it is preferable that the wireless signal includes an NBR-ADV message, a scanning-related message, a handover-related message, etc.

The modulation/demodulation unit 223 modulates and demodulates the wireless signal communicated with the base stations, so as to communicate the modulated or demodulated signal with the subscriber stations 210 through the transmitting/receiving unit 221.

The wireless environment checking unit 225 performs scanning of the wireless environment state of the neighboring base station through the transmitting/receiving unit 221.

The base station information storage unit 227 stores neighboring base station information received from the serving base station 230 through the transmitting/receiving unit 221.

The control unit 229 controls respective units 221, 223, 225, and 227, and determines whether the handover condition is satisfied according to the movement of the transportation means during the scanning of the wireless environment checking unit 225. In addition, the control unit 229 performs the handover to the target base station 260 through the transmitting/receiving unit 221 when the handover occurs. Then, when the handover process is completed, the control unit 229 notifies the dedicated ranging region information and handover completion to the subscriber stations 210, and performs the process of finishing connection with the serving base station 230.

Figure 5:
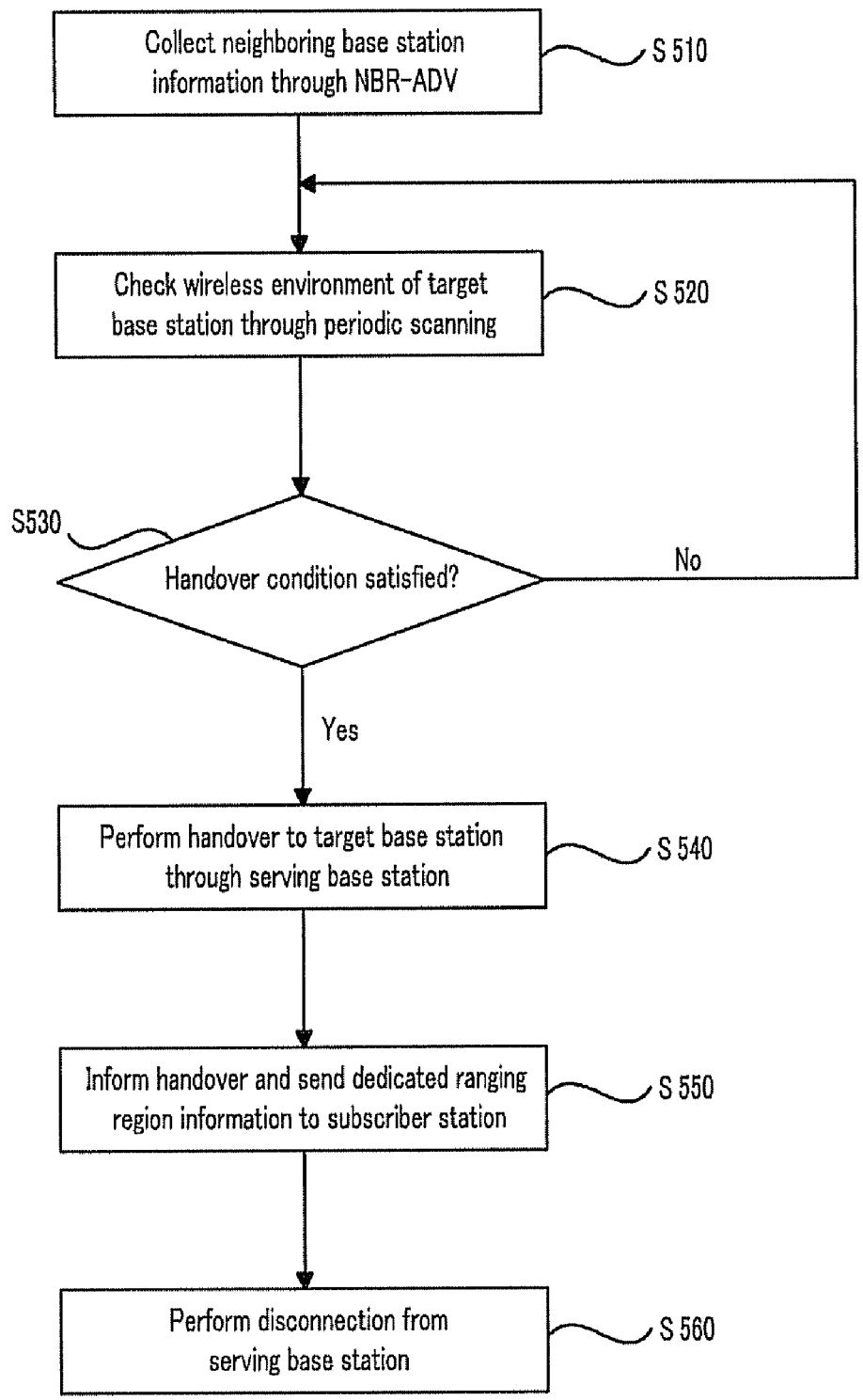
FIG. 5 is a flowchart showing a handover process taken by the wireless relay station according to an exemplary embodiment of the present invention.

FIG. 5 is a flowchart showing a handover process taken by the wireless relay station according to an exemplary embodiment of the present invention.

Firstly, the control unit 229 extracts neighboring base station information from the NBR-ADV message received from the serving base station 230 through the transmitting/receiving unit 221, and then stores the extracted information in the base station information storage unit 227 (S510).

Subsequently, the control unit 229 determines whether the handover condition is met while the wireless environment checking unit 225 scans the wireless environment state of the target base station 260 (S530).

When the handover condition is met at the step S530, the control unit 229 requests the handover to the target base station 260 through the serving base station 230, and then receives the handover acknowledgement response from the target base station 260 (S540). At this time, it is preferable that the control unit 229 receives the dedicated ranging region information from the target base station 260.

Subsequently, the control unit 229 notifies the subscriber stations 210 of the dedicated ranging region information and the handover completion to the target base station 260 (S550), and performs the process of finishing connection with the serving base station 230 (S560).

Figure 6:
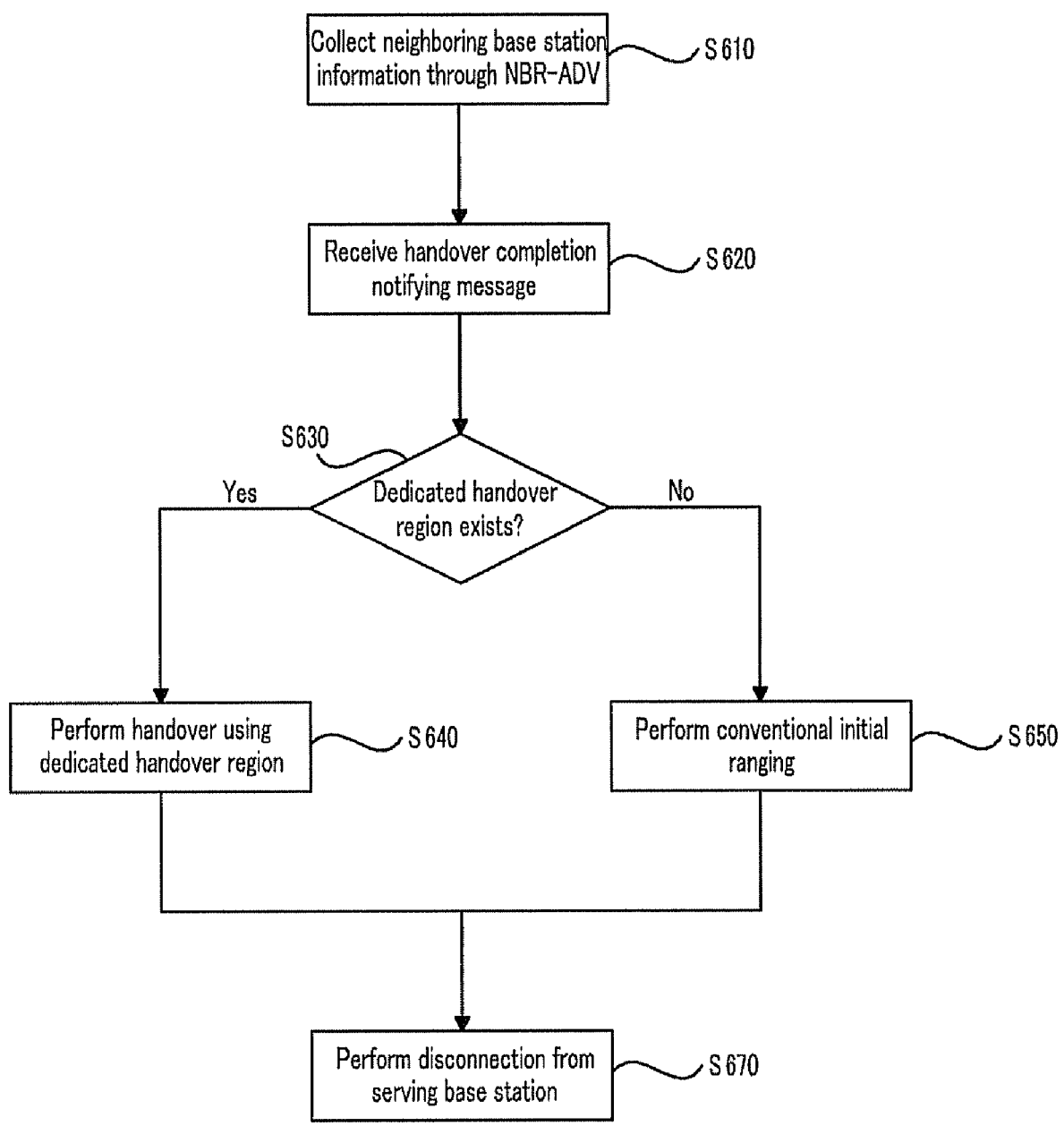
FIG. 6 is a flowchart showing a handover process taken by a subscriber station according to an exemplary embodiment of the present invention.

FIG. 6 is a flowchart showing a handover process taken by a subscriber station according to an exemplary embodiment of the present invention.

The subscriber stations 210 receive the NBR-ADV message from the serving base station 230 and thereby collect the neighboring base station information (S610).

Subsequently, the subscriber stations 210 receive the handover completion notification message from the serving base station 230 (S620), and then determine whether the dedicated handover ranging region is allocated by the target base station 260 to the subscriber stations 210 (S630).

When the dedicated handover ranging region is allocated by the target base station, the subscriber stations 210 performs the handover using the dedicated handover region allocated by the target base station 260 (S640).

When the dedicated handover ranging region is not allocated by the target base station, the subscriber stations 210 performs conventional initial ranging with the target base station 260 (S650).

Subsequently, when the target base station 260 is accessed by the ranging, the subscriber stations 210 perform the process of ending connection with the serving base station 230 (S670).

As described above, according an exemplary embodiment of the present invention, a wireless relay station performs a handover process by grouping a plurality of subscriber stations that have the same moving path. Therefore, the level of signaling required for the handover operation of the subscriber stations is reduced in comparison with simultaneous and separate handover operations of the subscriber stations. Consequently, the bandwidth management may become more efficient.

In addition, a dedicated handover ranging region is allocated to subscriber stations by the target base station, and therefore latency caused by the handover process is reduced since collision probability according to the bandwidth request of the subscriber stations decreases.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A handover method, comprising:
    receiving neighboring base station information at a wireless relay station providing a wireless communication service moving together with a plurality of subscriber stations that move along the same moving path;
    performing scanning to check a wireless environment state of a neighboring base station using the received neighboring base station information;
    performing handover of the plurality of subscriber stations to a target base station as a single handover unit, when a handover condition is met during the scanning; and notifying the subscriber station of completion of handover preparation with the target base station.

2. The handover method of claim 1, wherein, in the receiving of the neighboring base station information, the neighboring base station information is received from a service base station through an NBR-ADV (neighbor advertisement) message, the service base station being currently associated with the wireless relay station.

3. The handover method of claim 2, wherein the performing of the handover comprises:
sending subscriber station information and service class information of the plurality of subscriber stations from the wireless relay station to the target base station; and
allocating a dedicated handover ranging region by the target base station to the plurality of subscriber stations.

4. The handover method of claim 3, wherein the notifying the subscriber station of the completion of handover preparation comprises:
ending a connection with the service base station; and
notifying, to the plurality of subscriber stations, completion of the handover to the target base station and the dedicated handover ranging region information.

5. The handover method of claim 3, wherein the subscriber station information is unique basic connection identifiers (BCID) of the subscriber stations.

6. A system for enabling handover in a mobile communication network, comprising:
a wireless relay station that determines whether a handover condition for a plurality of subscriber stations moving along the same moving path is met, and requests handover of the plurality of subscriber stations as a single handover unit when the handover condition is met;
a serving base station that provides neighboring base station information to the wireless relay station and receives a handover request from the wireless relay station; and
a target base station that performs the requested handover with the wireless relay station when a handover request of the wireless relay station is received through the serving base station.

7. The system of claim 6, wherein the wireless relay station requests the handover by sending unique basic connection identifiers (BCID) and service class information of the subscriber stations to the target base station.

8. The system of claim 7, wherein the subscriber stations are grouped by the wireless relay station depending on service mobile communication networks such that uniform quality of service (QoS) is acquired during the handover of the subscriber stations.

9. The system of claim 6, wherein the target base station allocates a dedicated handover ranging region to the subscriber stations.

10. The system of claim 7, wherein, in order to determine whether the handover condition is met, the wireless relay station performs a scanning process for checking a wireless environment state of the neighboring base station based on the neighboring base station information received from the serving base station.

11. The system of claim 7, wherein the wireless relay station comprises:
a transmitting/receiving unit that transmits and receives a wireless signal to and from the serving base station and the target base station;
a base station information storage unit that stores the neighboring base station information received from the serving base station through the transmitting/receiving unit;
a wireless environment checking unit that checks the wireless environment state of the neighboring base station that corresponds to the neighboring base station information of the base station information storage unit; and
a control unit that determines whether the handover condition is met based on the wireless environment state of the neighboring base station, and requests handover to the target base station when the handover condition is met.

12. A handover method of a wireless relay station in a mobile communication network, comprising:
receiving neighboring base station information;
performing periodic scanning that checks a wireless environment state of a target base station using the neighboring base station information;
determining whether a handover condition is met during the checking of the wireless environment;
requesting handover of a plurality of subscriber stations to the target base station as a single handover unit when the handover condition is met, the plurality of subscriber stations moving along the same path;
receiving a handover preparation completion message from the target base station; and
sending, to the subscriber station, a message for notifying completion of handover preparation to the target base station.

13. The handover method of claim 12, wherein, in the receiving of the handover preparation completion message, the neighboring base station information is received from a service base station through an NBR-ADV (neighbor advertisement) message, the service base station being currently associated with the wireless relay station.

14. The handover method of claim 12, wherein requesting handover comprises sending subscriber station information and service class information of the subscriber stations to the target base station; and
the subscriber station information of the subscriber stations is unique basic connection identifiers (BCID) of the subscriber stations.

15. The handover method of claim 14, wherein the handover preparation completion message comprises information for a dedicated handover ranging region allocated by the target base station to the subscriber stations.

16. A wireless relay station performing handover in a mobile communication network, comprising:
a transmitting/receiving unit that transmits and receives wireless signal with a serving base station and a target base station, the serving base station being currently associated with the wireless relay system;
a base station information storage unit that stores neighboring base station information received from the serving base station through the transmitting/receiving unit;
a wireless environment checking unit that checks the wireless environment state of the neighboring base station that corresponds to the neighboring base station information of the base station information storage unit; and
a control unit that determines whether a handover condition for a plurality of subscriber stations moving along the same moving path is met based on the wireless environment state of the neighboring base station, and requests handover to the target base station when the handover condition is met.

17. The wireless relay station of claim 16, wherein the information storage unit receives the neighboring base station information from the serving base station through an NBR-ADV (neighbor advertisement) message.

18. A handover method of a subscriber station, comprising:

receiving a message notifying completion of handover preparation to a target base station, the message being received from a wireless relay station for a plurality of subscriber stations moving along the same moving path;

determining whether a dedicated handover region is allocated by the target base station; and performing ranging through the dedicated handover region when the dedicated handover is allocated.

19. A handover method of claim 18, wherein, when the dedicated handover region is not allocated, conventional initial ranging is performed with the target base station.

\* \* \* \* \*